United States Patent [19]

Aoki

[11] Patent Number: 4,573,552

[45] Date of Patent: Mar. 4, 1986

[54] SAFETY DEVICE FOR PROTECTING FALL OF A LIFT

[75] Inventor: Hiroyasu Aoki, Shizuoka, Japan

[73] Assignee: Yasui Sangyo Co., Ltd., Shizuoka, Japan

[21] Appl. No.: 634,167

[22] Filed: Jul. 25, 1984

[51] Int. Cl.[4] .............................................. B60S 13/00

[52] U.S. Cl. .................................... 187/8.5; 187/8.72; 254/10 B; 182/141

[58] Field of Search ...................... 187/8.47, 8.5, 8.41, 187/8.49, 8.71, 8.72, 18; 254/10 R, 10 B, 10 C, 2 R, 89 R, 122, 89 H, 93 R; 182/141, 63, 69, 112, 107; 74/527, 533, 534, 536

[56] References Cited

U.S. PATENT DOCUMENTS 1,275,381 8/1918 Butler et al. ........................ 187/8.49
3,317,004 5/1967 Harrison, Jr. ......................... 187/8.5

FOREIGN PATENT DOCUMENTS 56-357 1/1981 Japan .

*Primary Examiner*—Joseph J. Rolla
*Assistant Examiner*—Kenneth Noland
*Attorney, Agent, or Firm*—Poms, Smith, Lande & Rose

[57] ABSTRACT

A safety device of a lift for vehicles which has a stopper shaft and a rack to protect accidental fall of cradles of the lift during operations. The stopper shaft is pivoted at one end to an upper frame of the lift with sufficient flexibility for lateral movement, while another free end of the stopper shaft is kept at a resting position on an extension of the rack during the cradles being kept at the lowermost position. The rack is provided with a first guide comprising a vertical member disposed alongside the rack and a slightly inclined flat member under the rack, so that the free end of the stopper shaft moves over the rack without sheering off the course during rise of the cradles, and can be engaged with the rack when the cradles is stopped at a desired raised position. The rack is also provided with a passage for the free end having an inclined surface at one end near the resting position and a second guide mounted thereto to lead the free end on the extension of the rack. The stopper shaft is provided in the middle with a lever to bring the free end into the passage so that the free end automatically returns to the resting position through the passage and the second guide when the cradles are let down.

7 Claims, 6 Drawing Figures

SAFETY DEVICE FOR PROTECTING FALL OF A LIFT

BACKGROUND OF THE INVENTION

1. Field of the Invention

This invention relates to a safety device for a lift, and more particularly to a safety device for protecting fall of a lift for vehicles during painting, coating, and/or sheet metal working for automobiles, or the other working operations being performed.

2. Prior Art

A lift for vehicles which is well known in the art is shown in FIG. 1 and 2. The previous lift comprises an elevating mechanism (b) being installed on a lower frame (a) and cradles (c) provided on the upper end of the elevating mechanism, in which the elevating mechanism includes a link mechanism (d) constructed in parallelogram and a hydraulic cylinder (e), one end of the hydraulic cylinder opposite to its rod (f) being pivoted at the lower frame and one end of the rod (f) opposite to the cylinder portion also pivoted at an upper frame (g) or the upper side of the link mechanism (d) in parallelogram, the cradles (c) being elevated up and down by forward and backward movements of the rod (f) which is driven by the hydraulic cylinder.

In FIGS. 1 and 2, a safety device for protecting fall of a lift of the previous type comprises a rack (h) provided on the lower frame (a), and a stopper shaft (i) in which one end is pivoted to the upper frame (g) and another free end can be in engagement with the rack (h). The device is constructed such that one end of a lever (k) having a cam (j) is inserted into a bore formed at the free end of the stopper shaft (i), with movement of the lift being raised up, the free end of the stopper shaft (i) moves over teeth of the rack (h) one by one to the left in FIG. 2. In case oil pressure applied to the hydraulic cylinder (e) is released when the lift is raised up to a desired position, then, as it is shown in FIG. 3 by solid lines, the free end of the stopper shaft (i) comes into engagement with an adjacent tooth of the rack (h) to prevent the lift from falling down. When the lift is let down, the cam (j) is forced to stand in a upright position, as shown in FIG. 3 by dotted lines, by an operator's manual rotation of the lever (k), so that the free end of the stopper shaft (i) is disengaged to move over the teeth of the rack (h) to the right in FIG. 3.

However, the safety device for protecting fall of a lift described in the above has such drawbacks that a gap between the bore at the free end of the stopper shaft (i) and the end of the lever (k) inserted within the bore is apt to be filled with dust or it rusts therebetween so that the lever (k) may be obstructed of its smooth rotation, which may possibly invite dangerous situations such that the cam (j) is left standing, as shown in FIG. 3 by dotted lines, without being turned down to be engaged with a teeth of the rack (h). Also, because of the construction described as above, the device should be manufactured so accurate that it becomes more expensive.

SUMMARY OF THE INVENTION

It is an object of the invention to provide a safety device for protecting fall of a lift which overcomes the above mentioned disadvantages.

In accordance with the present invention, the device is characterized by that the stopper shaft which is pivoted at its one end to the lower surface of the cradles is also allowed for lateral movements, that there is provided with a passage for the free end of the stopper shaft alongside the rack, the passage being provided with a guide means to lead the free end of the said stopper shaft automatically to be set to a resting position on an longitudinal extension of the rack when the lift is positioned at the lowermost position, and that the stopper shaft is provided in the middle with a lever projecting laterally from the shaft, so as to bring the free end of the stopper shaft into the said passage by pulling the lever to the passage side when the lift is let down.

Preferably, in order for automatic and positive resetting the stopper shaft to the resting position, the guide means comprises a vertical member which runs straight along the passage and is bent to inside at the end near the resting position, and the passage includes a portion being inclined upwards near the resting position.

Also, another guide means is provided to the rack, comprising a vertical member disposed along the rack on opposite side of the passage, the vertical member being sufficiently higher than each tooth of the rack, and a flat member almost horizontal and preferably slightly inclined to the vertical member on which the rack is fixedly mounted, so that the free end of the stopper shaft may be effectively protected from sheering off the course during the lift being raised up. This guide means also assures of safety engagement of the free end of the stopper shaft with the rack when the lift is stopped at the desired position for operation.

In accordance with the present invention, the device is more reliable and safe in use because it assures engagement of the free end of the stopper shaft with the rack by its automatic return to the resting position.

BRIEF DESCRIPTION OF THE DRAWINGS

This invention will now be described, by way of example, with reference to the accompanying drawings, in which.

DESCRIPTION OF THE PREFERRED EMBODIMENT

Figure 1:
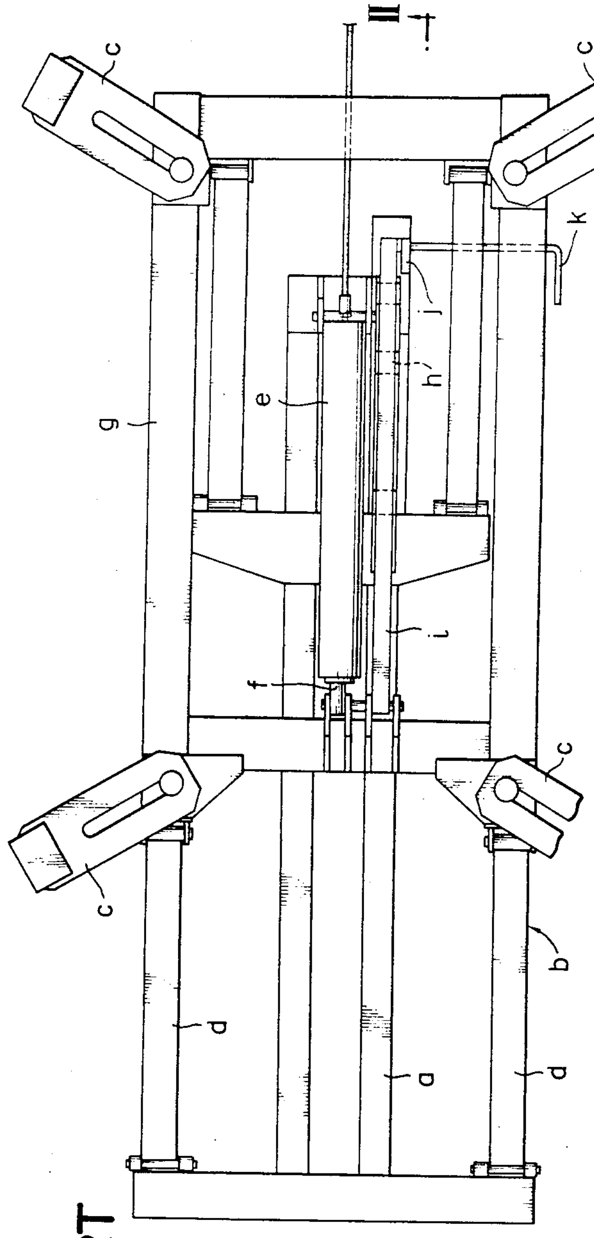
FIG. 1 PRIOR ART
FIG. 1 is a plan view of an embodiment of a lift being equipped with a safety device for protecting fall according to the prior art.
Figure 2:
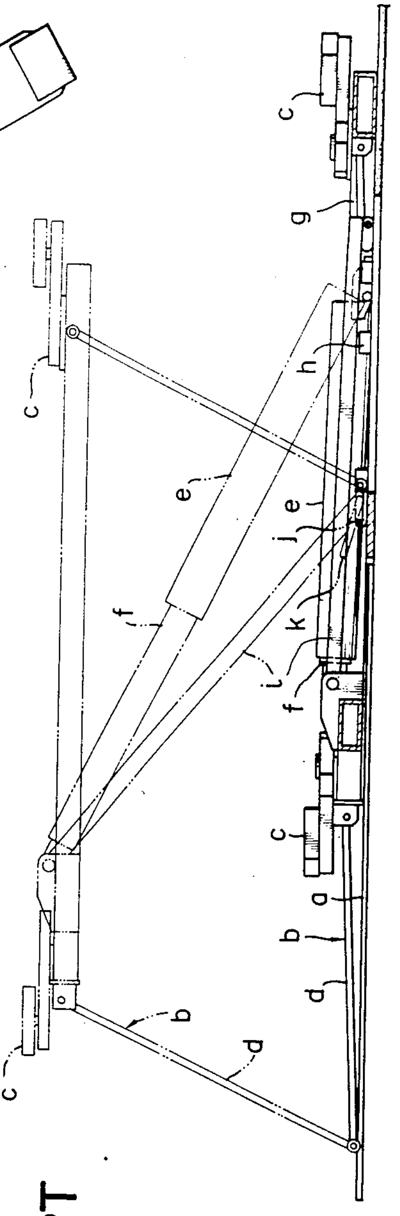
FIG. 2 PRIOR ART
FIG. 2 is a cross sectional view of the embodiment shown in FIG. 1 at the line II—II, showing the lift at the lowermost position by solid lines and at the raised position for operation by dotted lines.
Figure 3:
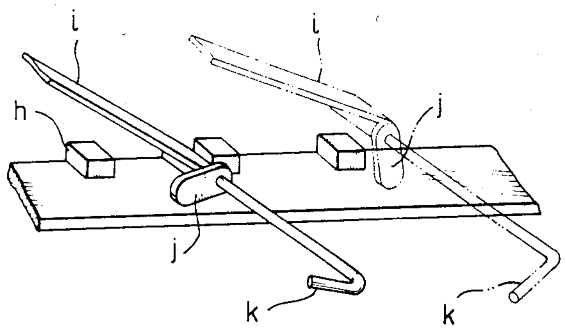
FIG.3 PRIOR ART
FIG. 3 is a perspective view of main components of the safety device shown in FIG. 1.
Figure 6:
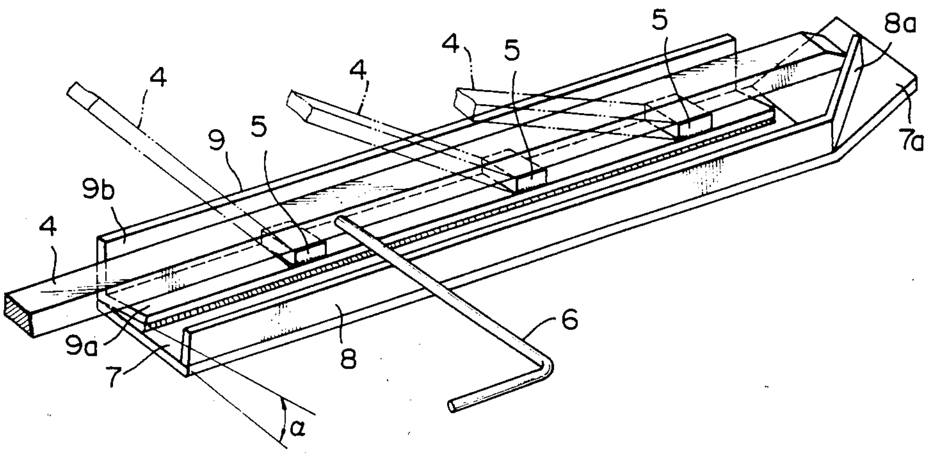
FIG. 6 is a perspective view of the main components of the embodiment in FIG. 4 which also shows movements of the stopper shaft by dotted lines.
Figure 4:
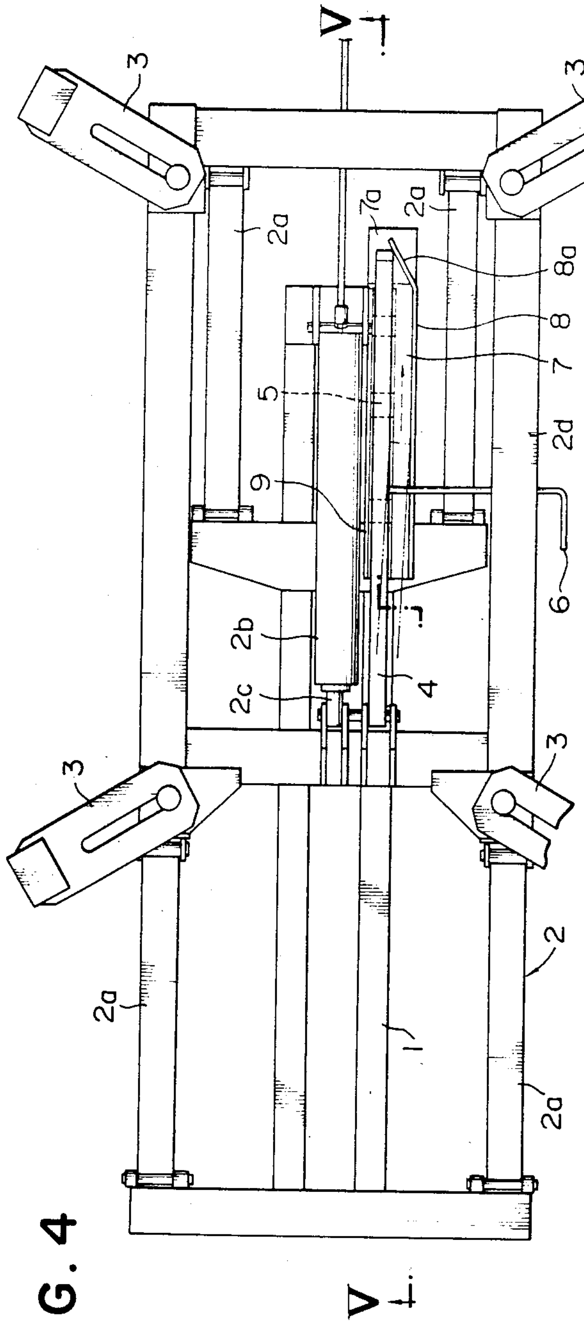
FIG. 4 is a plan view of an embodiment of the safety device in accordance with the present invention being mounted to a lift.
Figure 5:
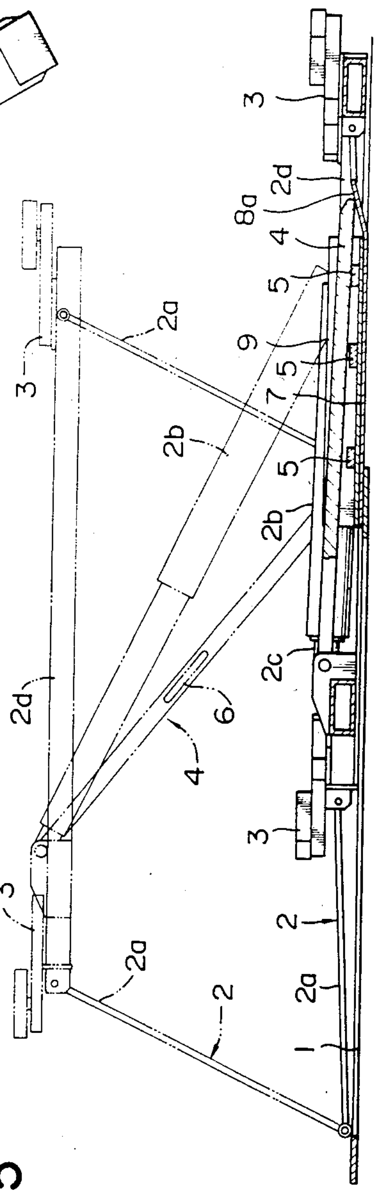
FIG. 5 is a cross sectional view of the embodiment shown in FIG. 4 at line V—V, showing the lift at the lowermost position by solid lines and at the raised position for operation by dotted lines.

Referring to FIGS. 4 to 6, there is provided an embodiment of the present invention, in which the numerical references 1 and 2 designate a lower frame and an elevating mechanism respectively.

The elevating mechanism 2 comprises a link mechanism *2a* in parallelogram being installed on the lower frame, and a hydraulic cylinder *2b*. One end of the cylinder *2b* opposite to the rod *2c* is pivoted at the lower frame 1 and the far end of the rod 2c which is opposite to the said end of the cylinder is also pivoted at the upper frame 2d of the upper side of the link mechanism in parallelogram. Cradles 3 are pivotally mounted at each corner of the upper frame 2d to support a vehicle under the lower part therewith. The cradles 3 are moved up and down by forward and backward movements of the rod 2c which is driven by operation of the hydraulic cylinder 2b.

The numerical references 4 and 5 designate a stopper shaft and a rack respectively. The stopper shaft 4 is at its one end pivoted to the upper frame 2d with sufficient flexibility to be allowed for lateral movements by employment of, for example, a pin having a smaller diameter than that of a hole formed at the end of the rod 2c through which the said pin is inserted to joint the rod to the upper frame 2d. A lever 6 is provided in the middle of the shaft 4 projecting in lateral direction from the shaft.

The rack 5 is mounted on the upper surface of the lower frame 1, more precisely, as shown in FIG. 6, on a flat surface 9a of a guide means or an angle member 9 which further includes a vertical member 9b along the rack 5. The flat surface 9a is preferably slightly inclined to the vertical member 9b at an angle $\alpha$ to the horizontal. In the prefered embodiment, the angle $\alpha$ is set at about 2°.

A passage 7 for movement of the free end of the stopper shaft 4 is provided beside the rack 5 opposite to the vertical member 9b on the lower frame 1. The passage 7 is also provided with another guide means 8 to lead the free end of the stopper shaft 4 onto an longitudinal extension of the rack 5, comprising a straight portion along the passage and a portion 8a which bends to the inside of the passage. Further, the passage 7 may have an inclined surface 7a which contributes more positive resetting of the stopper shaft in cooperation with the bent portion 8a of the guide means.

Now, the operation of the safety device of the invention will be described in details hereinafter.

When the cradles 3 are situated suitable to receive a vehicle for operation and the stopper shaft 4 is set at the resting position as shown in FIG. 6 by solid lines, a vehicle is led onto the cradles, and then oil pressure is applied into the hydraulic cylinder 2b to extend the rod 2c of the cylinder. With this driving operation of the hydraulic cylinder, the cradles 3 are raised up to lift the vehicle, while the free end of the stopper shaft 4 moves over the teeth of the rack 5 from the resting position to the left as illustrated in FIG. 6 by dotted lines. The free end of the stopper shaft will not sheer off the predetermined course over the rack during the above movement by the effect of the guide means 9.

When the vehicle is lifted upto an operative position of a desired height, further application of oil pressure to the hydraulic cylinder 2b is stopped. In case there might be any trouble, such as oil leakage, being occurred with the hydraulic cylinder 2b by accident, the cradles 3 would be protected from falling down by the free end of the stopper shaft 4 firmly in engagement with a teeth of the rack 5. The vertical member 9b and the inclined flat surface 9a of the guide means also assists in the engagement of the free end of the shaft without slippage or being off from the rack.

After completion of painting or sheet metal working operations, as the vehicle being kept at the operative position, the lever 6 is pulled to bring the free and of the stopper shaft 4 into the passage 7 disposed alongside the rack 5. As it has been described in the above, the stopper shaft 4 is allowed for lateral movements by its loose joint to the upper frame 2d, so that its free end can be drawn to the passage easily. With release of oil pressure applied within the hydraulic cylinder 2b, while the cradles 3 start to fall down, the free end of the stopper shaft 4 moves on the passage 7 to the right in the drawings along the guide means 8 without sheering off the passage. As the cradles 3 descends nearly to the lowermost position, by the bent portion 8a of the guide means 8 in cooperation with the inclined surface 7a of the passage 7, the free end of the stopper shaft 4 is automatically returned to the resting position on the extension of the rack 5.

Accordingly, the operation of the device is so simplified that, when the lift or the cradles is let down, simply by pulling the lever to the passage side, whereas the previous device requires turning a lever having a cam at the end to a proper position, the stopper shaft automatically returns to the operative condition ready for engagement with the rack in the next lifting operation.

Thus, according to the present invention, the stopper shaft is at its one end pivoted to the upper frame of the link mechanism with sufficient flexibility for lateral movements so that, when the lever is pulled to the passage side, the free end of the stopper shaft is automatically returned to the resting position on the extension of the rack by the effect of the guide means provided to the passage. Therefore, as it can be seen from the foregoing descriptions, the device has many advantages such that it is assured of more safety by that the free end of the stopper shaft can be positively engaged with the rack, of less expensive as it should not be accurate to manufacture the device, and the device can be operated very easily with high reliability.

I claim:

1. A safety device for protecting fall of a lift for vehicles, which comprises an elevating mechanism being provided at its upper end with cradles for supporting a vehicle under its lower part, said safety device including a stopper shaft being pivoted at one end to the upper end of the elevating mechanism and adapted for at another free end in engagement with a horizontal extending rack when the cradles is raised up to a desired operative position, characterized by that:
   - a passage for the free end of the stopper shaft to move along the rack when the lift is let down is formed beside the rack,
   - a first guide means is provided to said passage to lead said free end of the stopper shaft to a resting position on an extension of the rack where the cradles is at the lowermost position, and
   - said stopper shaft is pivoted to said upper end part of the elevating mechanism with sufficient flexibility to be allowed for lateral movements, and is also provided in the middle with a lever which projects laterally from the shaft, so as to bring said free end into said passage.

2. A device as claimed in claim 1, in which the first guide means comprises a vertical member which runs straight along the passage and is bent to inside of the passage near the resting position of the free end of the stopper shaft.

3. A device as claimed in claim 1, in which the rack is provided with a second guide means for preventing the free end of the stopper shaft from sheering off a predetermined course over the rack during the lift is raised up, comprising a flat member on which the rack is fixedly mounted, and a vertical member disposed along the rack on opposite side of the passage, said vertical member being at least higher than each tooth of the rack.

4. A device as claimed in claim 3, in which the flat member is slightly inclined to the vertical member of the second guide means.

5. A device as claimed in claim 3 or 4, in which the second guide means is composed of an angle member where the vertical member is integral with the flat member.

6. A device as claimed in claim 2, in which the passage has a portion being inclined upwards near the resting position.

7. A device as claimed in claim 2, in which the stopper shaft is pivoted by a pin having a smaller diameter than that of a hole formed at the end of the stopper shaft.

* * * * *